United States Patent
Smith et al.

(10) Patent No.: US 6,859,581 B1
(45) Date of Patent: Feb. 22, 2005

(54) OPTICAL FIBER MULTIPLEXER FOR RAMAN SPECTROSCOPY

(75) Inventors: Lee M. Smith, Salt Lake City, UT (US); Robert E. Benner, Salt Lake City, UT (US); Aaron Carpenter, Salt Lake City, UT (US); Eric Jacobsen, Salt Lake City, UT (US); Curtis Johnson, West Jordan, UT (US)

(73) Assignee: Process Instruments, Inc., Salt Lake City, UT (US)

( * ) Notice: Subject to any disclaimer, the term of this patent is extended or adjusted under 35 U.S.C. 154(b) by 5 days.

(21) Appl. No.: 10/405,459

(22) Filed: Apr. 2, 2003

(51) Int. Cl.[7] .............................. G02B 6/26; G02B 6/28; G02B 6/42; H04J 14/02
(52) U.S. Cl. .............................. 385/26; 385/24; 385/25; 385/31; 385/16; 398/79; 398/82
(58) Field of Search .............................. 385/16, 25, 26, 385/24, 31; 398/50, 56, 79, 82; 356/301

(56) References Cited

U.S. PATENT DOCUMENTS

| | | | |
|---|---|---|---|
| 4,805,977 A | | 2/1989 | Tamura et al. |
| 4,943,137 A | * | 7/1990 | Speer ........................ 385/26 |
| 4,953,932 A | * | 9/1990 | Mihich ...................... 385/26 |
| 4,958,904 A | * | 9/1990 | Rawski ...................... 385/26 |
| 4,989,932 A | | 2/1991 | Landa et al. |
| 5,005,934 A | | 4/1991 | Curtiss |
| 5,131,746 A | | 7/1992 | O'Rourke et al. |
| 5,210,590 A | | 5/1993 | Landa et al. |
| 5,450,194 A | | 9/1995 | Dureault et al. |
| 5,526,451 A | | 6/1996 | Cahill et al. |
| 5,664,034 A | * | 9/1997 | Mock ......................... 385/16 |
| 5,751,415 A | * | 5/1998 | Smith et al. ................ 356/301 |
| 6,100,975 A | * | 8/2000 | Smith et al. ................ 356/301 |
| 6,151,111 A | | 11/2000 | Wechsler et al. |
| 6,353,693 B1 | * | 3/2002 | Kano et al. .................. 385/26 |
| 6,418,247 B1 | | 7/2002 | Presley |
| 6,434,293 B1 | * | 8/2002 | Igeta et al. .................. 385/25 |
| 6,496,618 B1 | | 12/2002 | Fernando et al. |
| 2001/0038453 A1 | | 11/2001 | Jung et al. |

* cited by examiner

Primary Examiner—Frank G. Font
Assistant Examiner—Mary El-Shammaa
(74) Attorney, Agent, or Firm—Madson & Metcalf (57) ABSTRACT

An optical fiber multiplexer having a fixed plate and a rotating plate. A plurality of fiber-optic channels are coupled to the fixed plate in a circumferential arrangement. One fiber-optic channel is coupled to the rotating plate. Each fiber-optic channel may include one or more separate optical fibers. A servo motor rotates the rotating plate. Switching between channels occurs by rotating the rotating plate and aligning the optical fibers on the fixed plate and the rotating plate. Lens-to-lens coupling is used to transmit optical signals between the rotating and fixed plates. An adjustment device, such as a gimbal mount, may be used to adjust the horizontal and vertical axial alignment of the optical fibers coupled to the fixed plate so that optimum light signal transmission can occur. A control unit controls the operation of the servo motor.

50 Claims, 4 Drawing Sheets

OPTICAL FIBER MULTIPLEXER FOR RAMAN SPECTROSCOPY

BACKGROUND OF THE INVENTION

1. Field of the Invention

The present invention relates generally to the field of optical fiber multiplexers. More particularly, the invention relates to an optical fiber multiplexer that may be used in spectroscopy applications, such as Raman spectroscopy.

2. Description of Related Art

Raman scattering is a type of spectroscopy which measures very faint light scattering effects. Raman scattering is used to perform qualitative and quantitative chemical analysis of samples. Unlike other types of spectroscopy, the measured Raman light signal is relatively weak. Raman spectroscopy devices typically include a relatively powerful laser light source (200 to 600 mW), means for collecting and detecting the scattered light, and means for measuring and analyzing the scattered light. Optical fibers may be used to transmit an excitation light signal from a laser source to a probe and to transmit a detected scattered light signal from the probe to a Raman spectroscopy device. See, U.S. Pat. No. 5,751,415, U.S. Pat. No. 6,028,667, and U.S. Pat. No. 6,100,975.

Because laser sources and spectroscopy devices are relatively expensive, it would be an advancement in the art to provide a multiplexer device so that one laser source and spectrometer device can be used to analyze multiple chemical samples which are connected to the multiplexer with optical fibers. There is a need for such a multiplexer in industrial and research laboratory settings.

Fiber optic multiplexers used in spectroscopy are known and commercially available from Equitech International Corporation (www.equitechintl.com) and Piezosystem Jena, Inc. (www.piezojena.com). Both of these manufacturers use direct fiber-to-fiber coupling in their multiplexers. Butting one fiber against another is effective only for relatively low power applications. The high power required for Raman spectroscopy would create excessive power density at the end of the fiber. Under such circumstances, dust or other contamination at the end of the fiber can be vaporized, leaving an attenuating film to block and diminish the light signal transmission. Another disadvantage of fiber-to-fiber coupling is that it requires very accurate alignment of the fibers, something which may not be possible with repeatedly moving fibers. Thus, there is a need in the art for an effective optical fiber multiplexer that does not require fiber-to-fiber coupling.

Piezosystem Jena utilizes piezo motor control to move its optical fibers very small distances. One fiber can be switched between at most two or three fibers. Piezo motor systems cannot be used with large diameter fibers, such as, 400–1000 $\mu$m fibers. In order to have an 1.8 channel device it would be necessary to have three or more successive couplings. Each time a fiber is coupled to another fiber, transmission losses of 15% to 20% occur. This means that from 45% to 60% or more of the original Raman signal would be lost using a piezo motor system. The number of times a signal is coupled must be minimized with Raman spectroscopy since the original source signal (scattered light) is so weak, compared to other spectroscopy techniques. Thus, the Piezosystem Jena approach cannot be used effectively with a multi-channel device for Raman spectroscopy which requires large diameter fibers or requires more than about three channels.

The Equitech International system uses a worm gear to move a rotating plate. Worm gears are not desirable because they have a certain amount of slack (backlash) in the gear connection which results in accuracy problems. Moreover, over time, the gears wear and introduce additional alignment error. Backlash may be eliminated by pre-loading gears, but this would introduce severe gear wear and other problems. Similar errors arise due to the need for periodic lubrication of the gears. Thus, it would be an advancement in the art to provide an optical fiber multiplexer device that does not use a worm gear or similar gear-driven mechanism.

BRIEF SUMMARY OF THE INVENTION

The present invention is an optical fiber multiplexer used to for switching optical signals from one channel to another. The apparatus is particularly useful for spectroscopy applications, including those that transmit both high power optical excitation signals and extremely low level measured optical signals, such as exist in conventional Raman spectroscopy.

The apparatus within the scope of the present invention includes a housing structure having a fixed plate. A servo motor is disposed within the housing structure and drives a rotating plate. A plurality of optical fibers are coupled to the fixed plate in a circumferential arrangement, and one or more optical fibers are coupled to the rotating plate. Optical signals are transmitted between the fibers on the fixed plate and the fiber(s) on the rotating plate. Switching between channels occurs by rotating the rotating plate with the servo motor and aligning the optical fiber(s) on the rotating plate with corresponding fiber(s) on the fixed plate.

Instead of direct fiber-to-fiber coupling, the present invention utilizes lens-to-lens coupling. A pair of lenses is used: one to collimate the light signal from a fiber and the other to capture the collimated light and introduce the light signal into a fiber. The optical fibers that are transmitting an optical signal to either the fixed plate or to the rotating plate are preferably coupled to a collimating lens which creates a collimated light signal. The collimated light signal passes between the fixed plate and rotating plate to a collection lens located on the opposite plate. The collection lens captures the optical signal and focuses it onto its associated optical fiber.

The rotating plate, for example, may include an excitation optical fiber and a detection optical fiber which are configured to align with corresponding excitation optical fibers and detection optical fibers on the fixed plate. The excitation optical fiber transmits a light signal from a light source, such as a laser. The laser light may have a power in the range from 10 to 2000 mW, and more preferably in the range from 200 to 600 mW. The laser light may have a wavelength in the range from about 300 to 900 nm, and more preferably in the range from about 633 to 860 nm. If the multiplexer apparatus is used in spectroscopy applications, such as Raman spectroscopy, then the excitation optical fiber may transmit the light signal to a suitable chemical sample probe. The probe may include a separate detection optical fiber for transmitting the detected optical signal. The detection optical fiber transmits the optical signal to the fixed plate where it is collimated, transmitted to the rotating plate, captured and focused into a detection optical fiber which transmits the signal to a suitable spectroscopy device.

The servo motor should have sufficient power to provide inertial control and accurately move and hold steady position given the weight of the optical fibers and the rotating plate. The servo motor preferably provides a step resolution of about 1 $\mu$m. A control unit may be electronically coupled to the servo motor for controlling the operation of the servo motor and switching the fiber-optic channels.

The optical fibers used in connection with the present invention may be standard optical fibers having a diameter ranging from about 10 μm to about 1000 μm. Standard optical fiber connectors may be used, such as FC, SMA, or ST fiber connectors.

To assure accurate light transmission between the fibers on the fixed plate and the fibers attached to the rotating plate, an adjustment device (gimbal mount) is provided for each fiber on the fixed plate. The optical fibers are preferably coupled to the fixed plate using a gimbal mount which permits horizontal and vertical axial adjustment of the optical fiber so that optimum light signal transmission can occur. Fiber optic connectors are never made perfectly concentric to the fiber and thus the fibers need to be individually optimized for each connection. The gimbal mounts permit slight tilting and adjustment of the optical fiber and associated lens. The gimbal mounts may include a plurality of screws for adjustably attaching the gimbal mount to the fixed plate. An elastic material may be disposed between the gimbal mount and the fixed plate to facilitate vertical axial adjustment. The elastic material may include O-rings, mechanical springs, curved washers, wave washers, Belleville washer, disc spring, or similar structure.

Raman Spectroscopy is well suited for use with the multiplexer apparatus because of its compatibility with optical fibers and its ease of multiplexing. Each multiplexer channel may operate with its own unique Raman probe in a chemical stream or sample, wavenumber tracking parameters, throughput normalization, and chemometric model routine. Sequential multiplexing is preferred over on-chip multiplexing for several reasons including cost, the ability to tailor each individual channel's integration period, and the need for only one laser to serve many channels.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
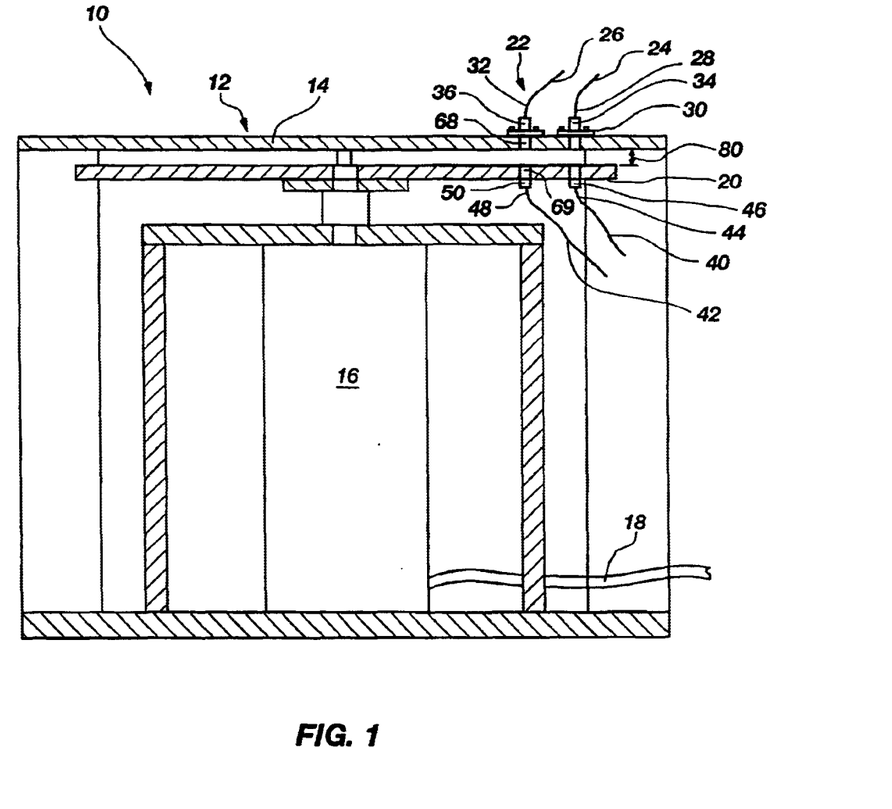
FIG. 1 is partial cross sectional view of an optical fiber multiplexer system within the scope of the present invention.
Figure 2:
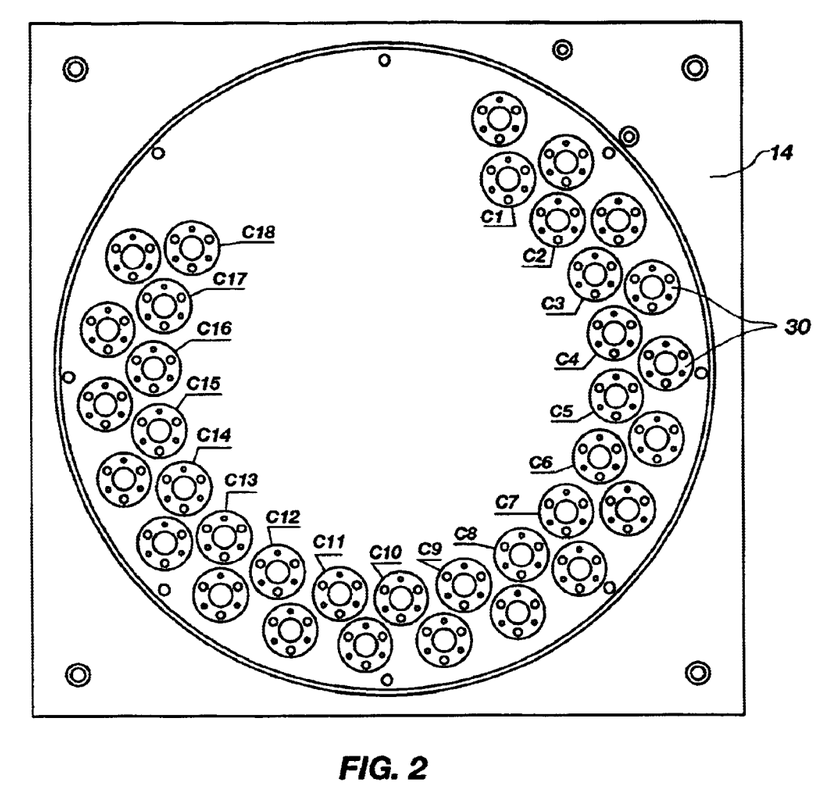
FIG. 2 is a top view of an eighteen channel optical fiber multiplexer system with a fixed plate containing eighteen collection fiber couplings and eighteen excitation fiber couplings.
Figure 3:
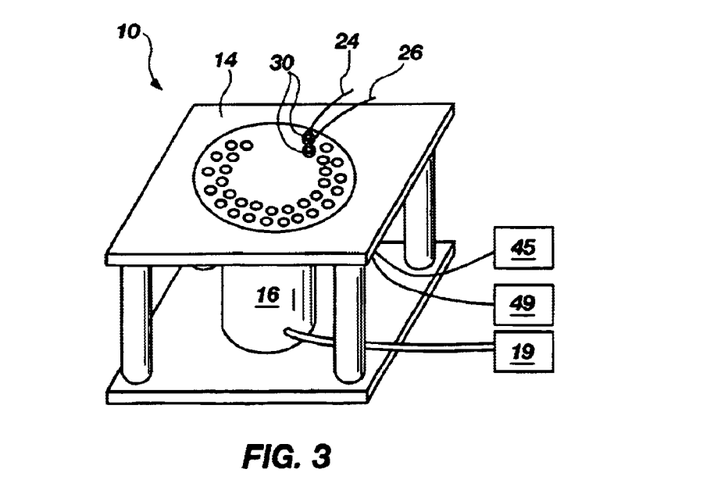
FIG. 3 is a perspective view of an optical fiber multiplexer system.

Reference is now made to the figures wherein like parts are referred to by like numerals throughout. With particular reference to FIGS. 1–3, optical fiber multiplexer apparatus 10 is illustrated. The multiplexer apparatus 10 includes a housing structure 12 and a fixed plate 14. A servo motor 16 is disposed within the housing structure 12. An electronic cable 18 may be provided to electronically couple the servo motor 16 to a control unit 19 for controlling the operation of the servo motor 16. The cable 18 may include a standard RS 232 serial connector. Electrical power for the servo motor may also be provided. The control unit may include a computer and appropriate control software. A rotating plate 20 is coupled to the servo motor 16. The rotating plate 20 may be substantially parallel to the fixed plate 14.

A plurality of fiber-optic channels 22 are coupled to the fixed plate 12. Each fiber-optic channel 22 may contain one or more optical fibers. For example, in the embodiment shown in FIGS. 1–3, the each fiber-optic channel contains two optical fibers, a light excitation optical fiber 24 and a detection optical fiber 26. The light excitation optical fiber 24 is preferably coupled at a first end 28 thereof to the fixed plate 14 using an adjustable gimbal mount 30 and coupled at a second end thereof to a probe (not shown) for use in analyzing a chemical sample. The detection optical fiber 26 is preferably coupled at a first end 32 thereof to the fixed plate 14 using an adjustable gimbal mount 30 and coupled at the other end thereof to the chemical sample probe. The chemical sample may be located close to the apparatus or remote from the apparatus using long optical fibers, up to about 200 meters. Each light excitation optical fiber 24 is preferably optically coupled to a collection lens assembly 34, such as the collection lens assembly 70 shown in FIG. 6. Each detection optical fiber 26 is preferably optically coupled to a collimating lens assembly 36, such as the collimating lens assembly 72 shown in FIG. 6. The size of the collection lens 34 and collimating lens assembly 36 may vary depending upon the size of the multiplexer apparatus, the optical requirements for which the apparatus is used, and cost considerations. In a presently preferred embodiment, the lenses are about 6 mm in diameter.

The number of fiber-optic channels may range from about 2 to 30. As the number of channels is increased, the amount of time to cycle through all channels and obtain experimental or process data will increase. Typical integration periods are three to five minutes per channel, and users usually do not want to wait more than or one hour or so between updates from any one channel. Therefore, the number of fiber-optic channels is more preferably between about 12 and 20. For simplicity, only two optical fibers and their associated gimbal mounts are illustrated in FIGS. 1 and 3. A typical layout of gimbal mounts on the fixed plate 14 for an 18 channel multiplexer apparatus is shown in FIG. 2. The channels are labeled C1 through C18. It will be appreciated that the optical fibers are located in a circumferential arrangement so that they can be aligned with the fibers coupled to the rotating plate 20. As shown, the light excitation optical fibers are located on the outer ring and the detection optical fibers are located on the inner ring. This configuration can, of course, be reversed. Additional fibers per channel may be disposed in additional concentric rings.

One fiber-optic channel may be coupled to the rotating plate 20. The number of optical fibers in the fiber-optic channel coupled to the rotating plate preferably corresponds to the number of optical fibers in each fiber-optic channel coupled to the fixed plate. For instance, if there are 18 channels, with each channel containing two optical fibers, then there would be 36 optical fibers coupled to the fixed plate. There would only be one channel, containing two optical fibers, coupled to the rotating plate 20. Switching from channel to channel occurs by rotating the rotating plate 20 and aligning its optical fibers with corresponding optical fibers coupled to the fixed plate. Typical switching times between adjacent channels may be about 2 seconds, but this time can vary depending upon the servo motor 16 and the control unit 19.

In the embodiment illustrated in FIGS. 1 and 3, a light excitation optical fiber 40 and a detection optical fiber 42 are coupled to the rotating plate 20. The light excitation optical fiber 40 is coupled at a first end 44 thereof to the rotating plate 20 and coupled at a second end thereof to a light source 45. The light excitation optical fiber 40 is optically coupled to a collimating lens assembly 46 and configured to transmit light from the light source through the collimating lens assembly 46 to a corresponding collection lens assembly 34 of one of the light excitation optical fibers 24 coupled to the fixed plate 14.

The detection optical fiber 42 is coupled at a first end 48 thereof to the rotating plate 20 and may be coupled at a second end thereof to a spectroscopy device 49, such as a Raman spectroscopy device. The detection optical fiber 42 is optically coupled to a collection lens assembly 50 and configured to receive an optical signal transmitted from a corresponding collimating lens assembly 36 of one of the detection optical fibers 26 coupled to the fixed plate 14.

The light source 45 may vary depending upon the desired application. For Raman applications, the light source 45 is preferably a laser producing an output power in the range from 10 to 2000 mW and a wavelength in the range from about 300 to 900 nm. More preferably, the light source 45 produces an output power in the range of 200 to 600 mW and a wavelength in the range from about 630 to about 860 nm. Suitable light-sources 45 are known and commercially available.

The optical fibers used in the present invention may range from small single-mode fibers to large multimode fibers. The optical fiber diameter may range from about 10 $\mu$m to about 1000 $\mu$m, and more preferably range from about 50 $\mu$m to about 600 $\mu$m. The optical fibers are preferably coupled to the apparatus using conventional fiber optic connectors, such as standard FC, SMA, or ST connectors. This is particularly useful for the fibers that are affixed to the fixed plate 14 via the gimbal mount 30. In practice, the optical fibers 40, 42 are coupled to the rotating plate during manufacturing. The alignment and orientation of the optical fibers 40, 42 may be adjusted and set at the factory. In contrast, the plurality of fibers 26, 28 will be coupled to the fixed plate at the time the multiplexer apparatus is set up on location. Gimbal mounts 30 are used to permit proper alignment and adjustment of each optical fiber. The gimbal mounts 30 preferably include a conventional fiber optic connector to facilitate coupling of the optical fibers to the gimbal mounts 30.

The servo motor 16 provides sufficient power to provide inertial control and accurately move and hold a steady position given the weight of the optical fibers 40, 42 and the rotating plate 20. If a large number of fiber-optic channels and associated optical fibers are used, then a more powerful servo motor 16 will be required to compensate for the larger rotating plate and number of optical fibers. The servo motor 16 preferably has an interval resolution greater than 30,000 steps per revolution. The greater the resolution, the greater the cost of the servo motor 16. Therefore, the resolution requirements must be balanced with the servo motor costs. The servo motor preferably has an accuracy of about 1 to 10 steps. The servo motor may have a step resolution of about 1 $\mu$m and mechanical repeatability of about 4 $\mu$m. Typically, the servo motor provides greater than about one half horsepower. For an 18 channel apparatus, in which each channel contains two optical fibers, an adequate servo motor has about 2,000,000 steps per revolution and about one horsepower.

The servo motor 16 directly drives the rotating plate and controls its alignment with the fixed plate without gear systems, like worm gears. Since there are no gears to wear and the bearing surfaces are sealed and pre-lubricated, there is no special maintenance required for the servo motor. In addition, with no gear systems, there is no problem with "backlash" or slack that can develop in gear systems. The alignment accuracy of the optical fibers is maintained after extended use. Another significant advantage of the servo motor is its ability to be computer controlled and monitored. Software can control the sequence of switching from channel to channel. Some channels may be updated more frequently than others, and the switching sequence may be automatically varied. The servo motor may also provide feedback to the control unit 19 regarding optical fiber position which can be analyzed and used to optimize optical fiber alignment.

Figure 4:
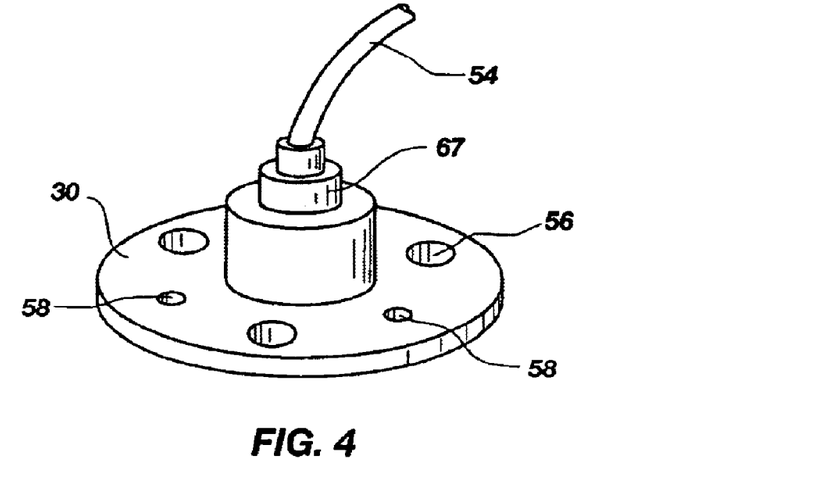
FIG. 4 is a perspective view of a gimbal mount used to couple an optical fiber to a fixed plate.
Figure 5:
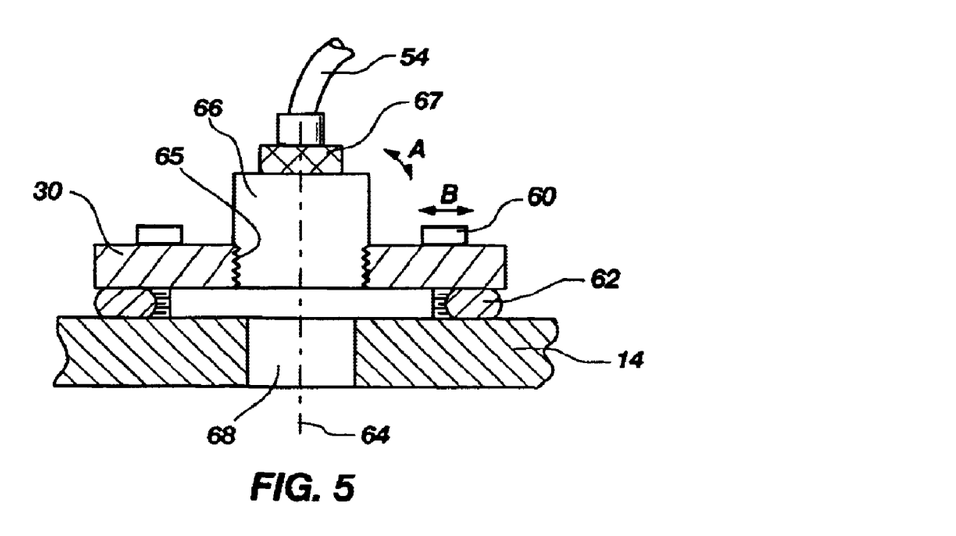
FIG. 5 is a partial cross sectional view of a gimbal mount coupled to the fixed plate.

The gimbal mount 30, shown in greater detail in FIGS. 4 and 5, provides horizontal and vertical axial adjustment of the optical fiber 54 relative to the fixed plate 14. The gimbal mount 30 preferably includes a plurality of holes 56, 58 designed for use with fasteners or screws 60 that engage the fixed plate 14. Holes 56, 58 may be of a different size. Holes 56 may be larger than the diameter of a corresponding screw 60 to permit adjustment of the gimbal mount 30, as represented by Arrow B, in a direction substantially parallel to the fixed plate 14. This may be in a lateral or horizontal direction. An elastic material 62 is preferably disposed between the gimbal mount 30 and the fixed plate 14 to facilitate vertical axial adjustment as shown by Arrow A. As used herein, the term vertical axial adjustment includes minor deviation of the vertical axis 64 compared to a normal vertical axis relative to the fixed plate 14. The elastic material may include a variety of materials and structures that permit vertical axial adjustment, such as an O-ring, a mechanical spring, a curved washer, a wave washer, or a Belleville washer or disc spring. A Belleville washer or disc spring is a shallow conical ring that can be subjected to axial loads. The mechanical spring, curved washer, wave washer, and Belleville washer or disc spring are usually manufactured from spring steel. O-rings and similar structures are constructed of elastomeric polymer materials.

The gimbal mount 30 preferably includes threads 65 or a similar attachment structure to which a lens assembly 66 may be secured. The lens assembly may include a collimating lens or a collection lens depending upon the direction of light transmission. A standard optical fiber connector 57, such as a FC, SMA, or ST connector, may be used to couple the optical fiber 54 to the lens assembly 66.

Figure 6:
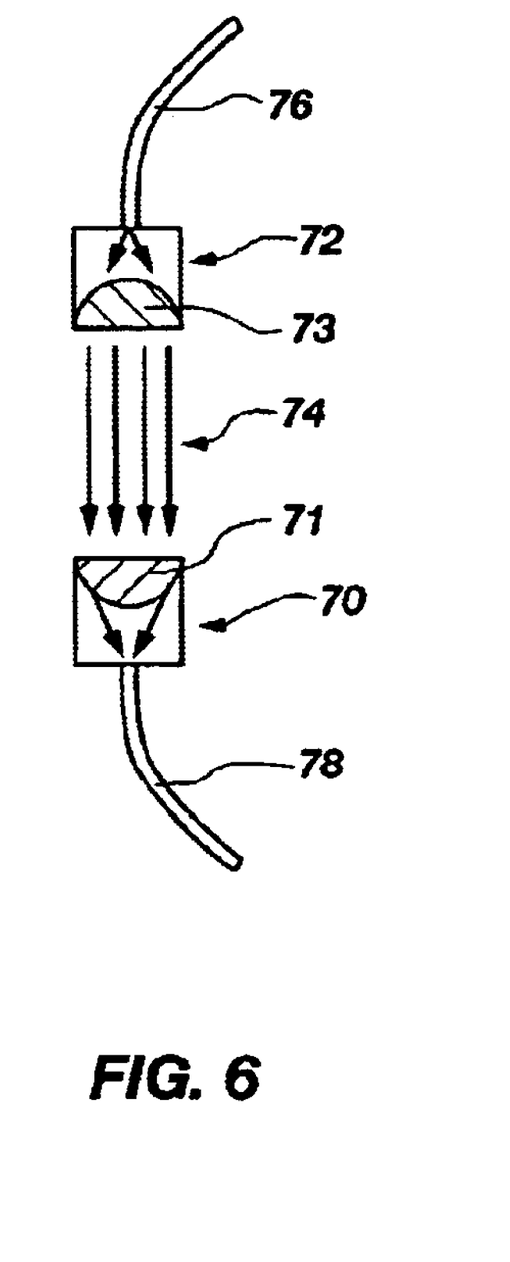
FIG. 6 is a schematic representation of the light transmission between a collimating lens and a collection lens.

FIG. 5 shows an opening or hole 68 in the fixed plate 14 aligned with the gimbal mount 30. A separate hole 68 is preferably associated with each optical fiber coupled to the fixed plate 14. A corresponding opening or hole 69 is located in the rotating plate 20. Similarly, there will be a hole 69 associated with each optical fiber coupled to the rotating plate 20. The hole 68 is sized to permit passage of a collimated light signal 74, a representation of which is shown in FIG. 6. It will be appreciated that the optical fibers coupled to rotating plate 20 are rotated by the servo motor 16 to be in alignment with corresponding fibers coupled to the fixed plate 14.

As shown in FIG. 6, an optical signal is transmitted from one optical fiber 76 to another optical fiber 78 through a lens-to-lens coupling. The optical signal is first collimated in the collimating lens assembly 72 using a collimating lens 73 to form collimated light signal 74, which is then received by a collection lens 71 in the collection lens assembly 70 and focused into the optical fiber 78. Suitable collimating and collection lenses are known and commercially available.

Collimating the light signal results in a slight loss of signal, compared to a corresponding fiber-to-fiber butt connection, but there are important advantages associated with collimating the light signal that offset the disadvantage. First, butt connections are not practical when high power lasers are used because any dust or residue residing on the optical fiber end will be vaporized leaving an attenuating film to block and diminish the light signal transmission. Second, butt connections require very precise alignment to be effective. Over time, the fibers may become misaligned, which results in a loss of optical signal. Finally, collimating lenses allow optical fibers to be directly coupled to the multiplexer apparatus without the use of additional fiber-to-fiber butt connectors that would otherwise be required to couple optical fibers to the multiplexer. Since every fiber-to-fiber connection results in a signal loss of about 25% per connection, and since at least two additional fiber-to-fiber connections would be required with each multiplexer channel, signal losses of 50% or more can be expected with known multiplexer devices. The number of fiber connectors should be minimized for both the excitation optical signal and detection optical signal.

Collimating the optical signal within the scope of the present invention permits transmission of powerful optical signals. A collimated optical signal will transmit much more optical signal if there is slight misalignment compared to a misaligned butt connection. Therefore, a greater and more consistent signal will be transmitted over time when the optical signal is collimated. Also, lens-to-lens coupling reduces the number of fiber connectors required, which substantially reduces the amount of optical signal loss. This is particularly important in Raman spectroscopy applications where the measured Raman scattering signal is weak to begin with and should be preserved. Extraneous fiber connections are preferably minimized. Finally, the collimating lenses can be AR (antireflective) coated for a particular wavelength region to further reduce coupling losses.

A collimated signal may travel significant distance without losing signal strength. In the present case, the separation distance 80 between the fixed plate 14 and rotating plate 20 may vary. The separation distance may range from about 1 to 100 mm, and more preferably range from about 2 to 15 mm.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

What is claimed is:

1. An optical fiber multiplexer for use with a spectroscopy device comprising:
    a housing structure comprising a fixed plate;
    a servo motor disposed within the housing structure configured to be electronically coupled to a control unit for controlling the operation of the servo motor;
    a rotating plate coupled to the motor;
    a plurality of fixed plate optical fibers, wherein each fixed plate optical fiber is coupled at one end thereof to the fixed plate using an adjustable gimbal mount which permits horizontal and vertical axial adjustment of the optical fiber, and wherein each fixed plate optical fiber is optically coupled to either a collimating lens or a collection at the gimbal mount; and
    a rotating plate optical fiber coupled at one end thereof to the rotating plate, and wherein said rotating plate optical fiber is optically coupled either to a collection lens or to a collimating lens and configured either to receive an optical signal through the collection lens from a corresponding collimating lens of one of the fixed plate optical fibers or to transmit light from a light source through the collimating lens to a corresponding collection lens of one of the fixed plate optical fibers.

2. An optical fiber multiplexer according to claim 1, wherein the servo motor provides sufficient power to provide inertial control and accurately move and hold steady position given the weight of the optical fibers and the rotating plate.

3. An optical fiber multiplexer according to claim 1, wherein the servo motor provides a step resolution of about 1 $\mu$m.

4. An optical fiber multiplexer according to claim 1, wherein the optical fibers have a diameter ranging from about 10 $\mu$m to about 1000 $\mu$m.

5. An optical fiber multiplexer according to claim 1, wherein the optical fibers are coupled to the gimbal mounts using a standard FC, SMA, or ST fiber connector.

6. An optical fiber multiplexer according to claim 1, wherein the gimbal mounts comprise a plurality of screws for adjustably attaching the gimbal mount to the fixed plate.

7. An optical fiber multiplexer according to claim 1, wherein the gimbal mounts comprise an elastic material disposed between the gimbal mount and the fixed plate to facilitate vertical axial adjustment.

8. An optical fiber multiplexer according to claim 7, wherein the elastic material is selected from an O-ring, mechanical spring, curved washer, wave washer, Belleville washer or disc spring.

9. An optical fiber multiplexer according to claim 1, wherein the rotating plate optical fiber is configured to be coupled at the other end thereof to a spectroscopy device.

10. An optical fiber multiplexer according to claim 1, wherein the plurality of fixed plate optical fibers are coupled at the other ends thereof to a plurality of chemical samples.

11. An optical fiber multiplexer comprising:
    a housing structure comprising a fixed plate;
    a servo motor disposed within the housing structure electronically coupled to a control unit for controlling the operation of the servo motor;
    a rotating plate coupled to the motor;
    a plurality of fixed plate light excitation optical fibers, wherein each light excitation optical fiber is coupled at one end thereof to the fixed plate using an adjustable gimbal mount which permits horizontal and vertical axial adjustment of the optical fiber, and wherein each fixed plate light excitation optical fiber is optically coupled to a collection lens;
    a plurality of fixed plate detection optical fibers, wherein each fixed plate detection optical fiber is coupled at one end thereof to the fixed plate using an adjustable gimbal mount which permits horizontal and vertical axial adjustment of the optical fiber, and wherein each fixed plate detection optical fiber is optically coupled to a collimating lens;
    a rotating plate light excitation optical fiber coupled at one end thereof to the rotating plate, and wherein said rotating plate light excitation optical fiber is optically coupled to a collimating lens and configured to transmit light from a light source through the collimating lens to a corresponding collection lens of one of the fixed plate light excitation optical fibers; and a rotating plate detection optical fiber coupled at one end thereof to the rotating plate, and wherein said rotating plate detection optical fiber is optically coupled to a collection lens and configured to receive an optical signal through the collection lens from a corresponding collimating lens of one of the fixed plate detection optical fibers.

12. An optical fiber multiplexer according to claim 11, wherein the servo motor provides sufficient power to provide inertial control and accurately move and hold steady position given the weight of the optical fibers and the rotating plate.

13. An optical fiber multiplexer according to claim 11, wherein the servo motor has an interval resolution greater than 30,000 steps per revolution.

14. An optical fiber multiplexer according to claim 13, wherein the servo motor has an accuracy of about 1 to 10 steps.

15. An optical fiber multiplexer according to claim 11, wherein the servo motor provides a step resolution of about 1 $\mu$m.

16. An optical fiber multiplexer according to claim 11, wherein the servo motor provides greater than about one half horsepower.

17. An optical fiber multiplexer according to claim 11, wherein the optical fibers have a diameter ranging from about 10 $\mu$m to about 1000 $\mu$m.

18. An optical fiber multiplexer according to claim 11, wherein the optical fibers have a diameter ranging from about 50 $\mu$m to about 600 $\mu$m.

19. An optical fiber multiplexer according to claim 11, wherein the optical fibers utilize standard FC, SMA, or ST fiber connectors.

20. An optical fiber multiplexer according to claim 11, wherein the light source is laser light at a power in the range from 10 to 2000 mW.

21. An optical fiber multiplexer according to claim 11, wherein the light source is laser light at a power in the range from 200 to 600 mW.

22. An optical fiber multiplexer according to claim 11, wherein the light source has a wavelength in the range from about 300 to 900 nm.

23. An optical fiber multiplexer according to claim 11, wherein the light source has a wavelength in the range from about 633 to 860 nm.

24. An optical fiber multiplexer according to claim 11, wherein the plurality of fixed light source optical fibers and the plurality of fixed detection optical fibers are provided in fiber pairs comprising a light excitation optical fiber and a detection optical fiber.

25. An optical fiber multiplexer according to claim 11, wherein the number of fiber pairs ranges from 2 to 30.

26. An optical fiber multiplexer according to claim 11, wherein the fixed plate and the rotating plate are spaced a distance in the range from about 1 to 100 mm.

27. An optical fiber multiplexer according to claim 11, wherein the fixed plate and the rotating plate are spaced a distance in the range from about 2 to 15 mm.

28. An optical fiber multiplexer according to claim 11, wherein the gimbal mounts comprise a plurality of screws for adjustably attaching the gimbal mount to the fixed plate.

29. An optical fiber multiplexer according to claim 11, wherein the gimbal mounts comprise an elastic material disposed between the gimbal mount and the fixed plate to facilitate vertical axial adjustment.

30. An optical fiber multiplexer according to claim 29, wherein the elastic material is selected from an O-ring, mechanical spring, curved washer, wave washer, Belleville washer or disc spring.

31. An optical fiber multiplexer according to claim 11, wherein the optical fibers are coupled to the gimbal mounts using a standard FC, SMA, or ST connector.

32. An optical fiber multiplexer according to claim 11, wherein the rotating plate detection optical fiber is configured to be coupled at the other end thereof to a spectroscopy device.

33. An optical fiber multiplexer according to claim 32, wherein the spectroscopy device is a Raman spectroscopy device.

34. An optical fiber multiplexer according to claim 11, wherein the plurality of fixed plate light excitation optical fibers are coupled at the other ends thereof to a plurality of chemical samples.

35. An optical fiber multiplexer according to claim 11, wherein the plurality of fixed detection optical fibers are coupled at the other ends thereof to a plurality of chemical samples.

36. An optical fiber multiplexer comprising:

a housing structure comprising a fixed plate;

a servo motor disposed within the housing structure and configured to be electronically coupled to a control unit for controlling the operation of the servo motor, wherein the servo motor provides sufficient power to provide inertial control and accurately move and hold a steady position given the weight of the optical fibers and the rotating plate;

a rotating plate coupled to the motor;

a plurality of fiber-optic channels coupled to the fixed plate, wherein each fiber-optic channel comprises:

a light excitation optical fiber coupled at one end thereof to the fixed plate using an adjustable gimbal mount and coupled at the other end thereof to a chemical sample, wherein the gimbal mount provides horizontal and vertical axial adjustment of the optical fiber, and wherein the light excitation optical fiber is optically coupled to a collection lens; and a detection optical fiber coupled at one end thereof to the fixed plate using an adjustable gimbal mount and coupled at the other end thereof to the chemical sample, wherein the gimbal mount provides horizontal and vertical axial adjustment of the optical fiber, and wherein the detection optical fiber is optically coupled to a collimating lens;

wherein the number of fiber-optic channels ranges from 2 to 30;

a light excitation optical fiber coupled at one end thereof to the rotating plate, wherein said light excitation optical fiber is optically coupled to a collimating lens and configured to transmit light from a light source through the collimating lens to a corresponding collection lens of one of the fixed light excitation optical fibers, and wherein the light excitation optical fiber is configured to be coupled at the other end thereof to a laser light excitation producing an output power in the range from 10 to 2000 mW and a wavelength in the range from about 300 to 900 nm; and a detection optical fiber coupled at one end thereof to the rotating plate, wherein said detection optical fiber is optically coupled to a collection lens and configured to receive a detected optical signal through the collection lens from a corresponding collimating lens of one of the fixed detection optical fibers, and wherein the detection optical fiber is configured to be coupled at the other end thereof to a spectroscopy device.

37. An optical fiber multiplexer according to claim 36, wherein the servo motor has an interval resolution greater than 30,000 steps per revolution.

38. An optical fiber multiplexer according to claim 37, wherein the servo motor has an accuracy of about 1 to 10 steps.

39. An optical fiber multiplexer according to claim 36, wherein the servo motor provides a step resolution of about 1 μm.

40. An optical fiber multiplexer according to claim 36, wherein the servo motor provides greater than about one half horsepower.

41. An optical fiber multiplexer according to claim 36, wherein the optical fibers have a diameter ranging from about 10 μm to about 1000 μm.

42. An optical fiber multiplexer according to claim 36, wherein the optical fibers have a diameter ranging from about 50 μm to about 600 μm.

43. An optical fiber multiplexer according to claim 36, wherein the optical fibers utilize standard FC, SMA, or ST connectors.

44. An optical fiber multiplexer according to claim 36, wherein the fixed plate and the rotating plate are spaced a distance in the range from about 1 to 100 mm.

45. An optical fiber multiplexer according to claim 36, wherein the fixed plate and the rotating plate are spaced a distance in the range from about 2 to 15 mm.

46. An optical fiber multiplexer according to claim 36, wherein the gimbal mounts comprise a plurality of screws for adjustably attaching the gimbal mount to the fixed plate.

47. An optical fiber multiplexer according to claim 36, wherein the gimbal mounts comprise an elastic material disposed between the gimbal mount and the fixed plate to facilitate vertical axial adjustment.

48. An optical fiber multiplexer according to claim 47, wherein the elastic material is selected from an O-ring, mechanical spring, curved washer, wave washer, Belleville washer or disc spring.

49. An optical fiber multiplexer according to claim 36, wherein the optical fibers are coupled to the gimbal mounts using a standard FC, SMA, or ST connector.

50. An optical fiber multiplexer according to claim 36, wherein the spectroscopy device is a Raman spectroscopy device.

* * * * *